United States Patent [19]

Chang

[11] Patent Number: 5,363,946
[45] Date of Patent: Nov. 15, 1994

[54] AUTOMATION DEVICE FOR AUTOMOBILE MANUAL SHIFT SYSTEM

[76] Inventor: Shih-Hung Chang, No. 11-4, Alley 45, Lane 312, Sec. 2, Chung San Rd., Chung Ho City,

[21] Appl. No.: 71,446

[22] Filed: Jun. 2, 1993

[51] Int. Cl.⁵ ............................................. B60K 41/22
[52] U.S. Cl. .................................. 192/3.58; 192/3.61
[58] Field of Search ............... 192/3.58, 3.61, 3.62, 192/3.54, 3.55

[56] References Cited

U.S. PATENT DOCUMENTS

| | | | |
|---|---|---|---|
| 3,204,730 | 9/1965 | Alfieri et al. | 192/3.58 X |
| 3,288,496 | 1/1966 | Riehl | 192/3.58 |
| 3,910,388 | 10/1975 | Moori et al. | 192/3.58 X |
| 4,144,424 | 3/1979 | Takeda et al. | 192/3.58 X |
| 4,158,404 | 6/1979 | Yamashita et al. | 192/3.58 |
| 4,183,424 | 1/1980 | Rumyantsev et al. | 192/3.58 |
| 4,275,804 | 6/1981 | Szarka et al. | 192/3.58 |
| 4,280,604 | 7/1981 | Lambicco | 192/3.58 X |
| 4,344,514 | 8/1982 | Fujihara et al. | 192/3.58 |
| 4,505,364 | 3/1985 | Goucher et al. | 192/3.58 X |
| 5,038,901 | 8/1991 | Parsons et al. | 192/3.58 X |

FOREIGN PATENT DOCUMENTS

| | | | |
|---|---|---|---|
| 212522 | 10/1956 | Australia | 192/3.62 |
| 2-109750 | 4/1990 | Japan | 192/3.62 |

*Primary Examiner*—Andrea Pitts
*Attorney, Agent, or Firm*—W. Wayne Liauh

[57] ABSTRACT

An automation device for automobile manual shift system, which comprises a shift key to control an intake electric valve to cause a highly compressed air to enter a power cylinder for driving a clutch pump; such automation device is used for replacing the conventional clutch pedal. There are exhausting electric valves, which will be opened upon the accelerator pedal being stepped down so as to have a highly compressed air exhaust out of the power cylinder to pull back the clutch pump, and the shift change is done; the automation device also comprises a shift-removing key for clearing the shift set if necessary.

1 Claim, 3 Drawing Sheets

AUTOMATION DEVICE FOR AUTOMOBILE MANUAL SHIFT SYSTEM

BACKGROUND OF THE INVENTION

In the conventional manual shift system of the automobile, a clutch is installed in the transmission system; the clutch is usually used to have an engine disengaged from the transmission case of vice versa. Before changing the shift, the clutch pedal has to be stepped down to have the engine disengaged from the transmission case. After a shift is set, the clutch pedal will be released slowly to complete the power transmission.

However, the aforesaid conventional clutch pedal method is easily to cause a driver to feel tried as result of repeatedly stepping and releasing the clutch. When stepping down or releasing the clutch pedal, a driver has to watch the speed and force of such stepping; otherwise, the clutch plates are subject to wear and tear, and therefore the clutch is often out of order, and it has to be repaired from time to time to cause a considerable repair cost. Currently, an automatic transmission device has been used widely in many automobiles so as to save the cumbersome procedures for clutch and shift operation; however, the automatic transmission device would cause an automobile to have insufficient power and torsional force.

SUMMARY OF THE INVENTION

This invention relates to an automation device for automobile manual shift system; the automation device comprises an air compressor, which is coupled with the engine through a belt. When the engine runs, the air compressor will produce a high compressed air to be stored in an air tank, which is connected with a power cylinder through a compressed air pipe. A shift key and an intake electric valve are assembled to control the compressed air to flow into the power cylinder to drive a clutch pump, which is used for changing the shift system. When pushing the accelerator, the accelerator pedal is coupled with two exhausting electric valves; when the two valves are opened, the compressed air will be exhausted out of the power cylinder so as to have the power cylinder returned to the previous condition thereof, and the clutch pump will also be returned, and then the shift changing is done. The device also comprises a shift-removing key (i.e., a neutral key) to set the shift at a neutral condition. By means of the aforesaid shift key and the shift-removing key, the clutch pedal can be omitted so as to minimize the driver's tiredness during driving a car, and to prevent from incorrect operation to the clutch; in other words, the clutch plates will have a longer serviceable life so as to reduce the replacement cost of a clutch. Moreover, the automation device according to the present invention would not affect the horse power and the torsional force of a car operated with a manual clutch, without feeling the car having insufficient power.

BRIEF DESCRIPTION OF THE DRAWINGS

FIG. 3-B illustrates the aforesaid contact switch condition upon the accelerator being stepped down heavily.

DETAILED DESCRIPTION

Figure 1:
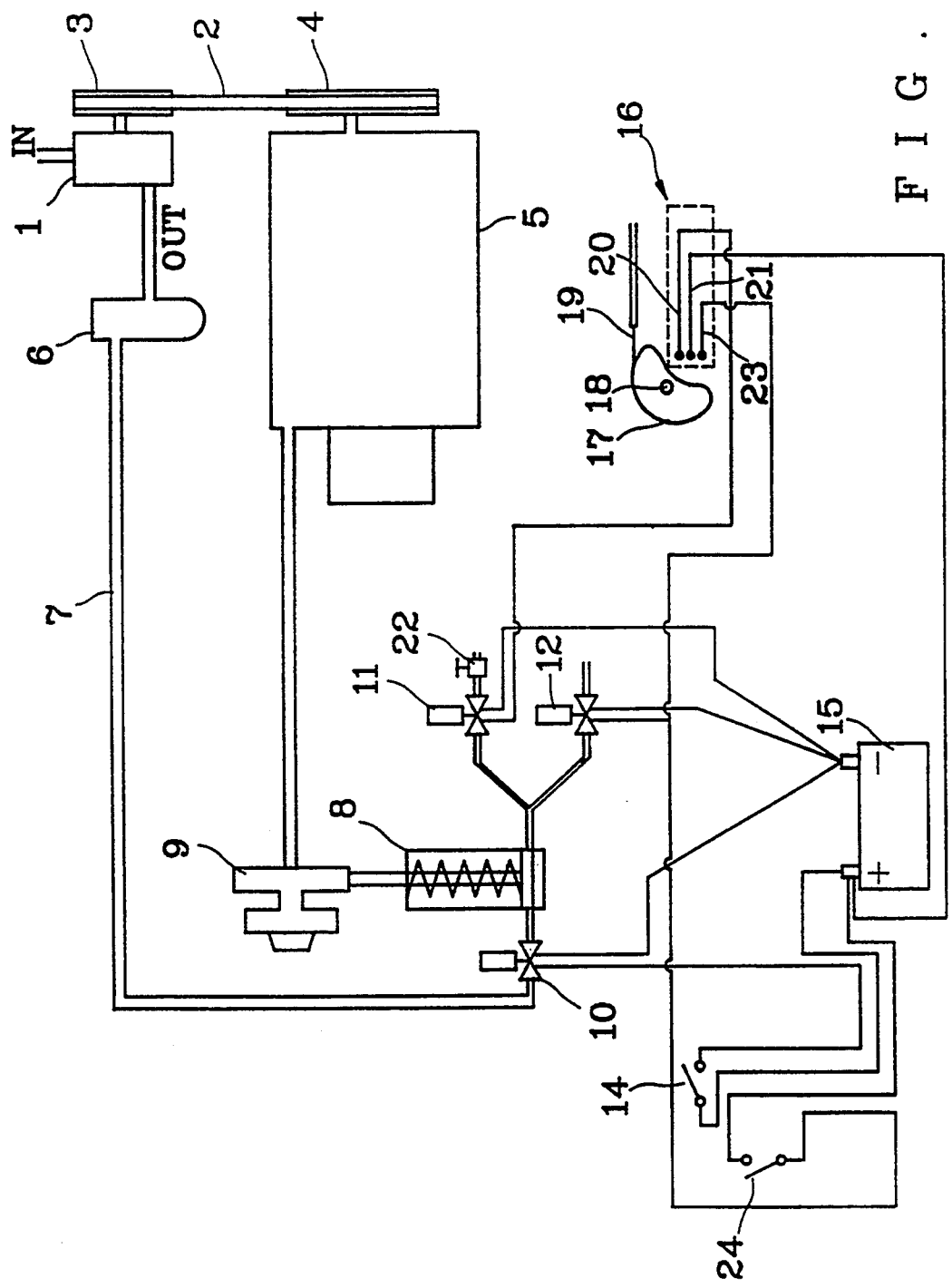
FIG. 1 is a schematic diagram of the control system according to the present invention.
Figure 2:
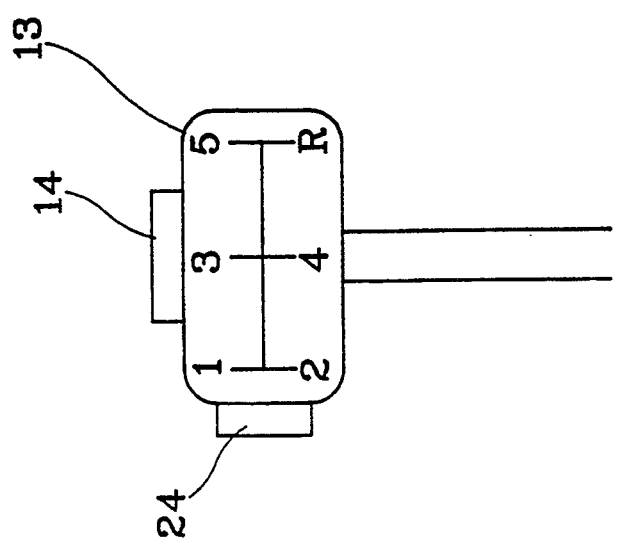
FIG. 2 is a plan view of the shift keys and the shift-removing key mounted on the shift rod according to the present invention.
Figure 3A:
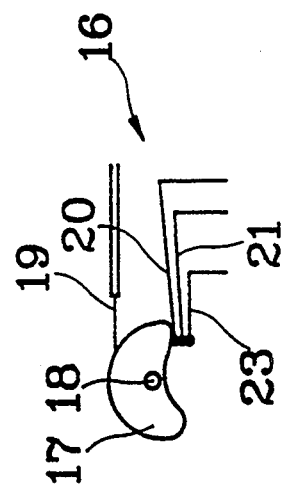
FIG. 3-A is a schematic diagram of the contact switch according to the present invention, upon the accelerator being steeped down slightly.
Figure 3B:
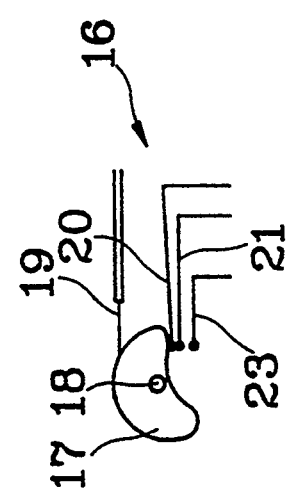

FIG. 1 illustrates a schematic diagram of the control system according to the present invention, which comprises an air compressor 1 to be coupled with the car engine 5 through a belt 2 and two belt pulleys 3 and 4. When the engine 5 runs, the air compressor 1 will be driven to run to produce a compressed air, which is stored in an air tank 6; the air reservoir 6 is connected with a power cylinder 8 through a compressed-air pipe 7. The power cylinder 8 is used for driving a clutch pump 9. The clutch pump functions to actuate/deactuate a conventional clutch, which engages and/or disengages an engine in the engine/clutch combination 5 from a power transmission assembly. Between the air tank 6 and the power cylinder 8, there is an intake electric valve 10 to control the intake of the power cylinder 8; the cylinder is further installed with two exhausting electric valves 11 and 12. The intake electric valve 10 is connected, by means of a circuit, with a shift key 14 (referring to FIG. 2) on the top of the shift rod 13. The shift key 14 is substantially a switch. As soon as the shift key 14 is turned on, the battery 15 will be turned on to actuate the intake electric valve 10, which will let the compressed air in the air tank 6 flow through the compressed-air pipe 7 and into the power cylinder 8 to drive the clutch pump 9 so as to have the engine disengaged from the power transmission assembly so as to shift gears. After the manual shift change is done, step down the accelerator pedal 25 to drive a car; in that case, the exhausting electric valves 11 and 12 are connected, through a circuit with a contact switch 16, which includes a first conductor 20, a second conductor 21 and a third conductor 22; the upper part of the switch 16 is furnished with a coupling member 17 that is pivotally mounted on a shaft 18. The upper part of the coupling member 17 is connected with an accelerator cable 19. When the accelerator pedal 25 is pushed down, the accelerator cable 19 will pull the coupling member 17 to turn downwards and to pull the contact switch 16. When the accelerator pedal 25 is slightly pushed down, the coupling member 17 merely cause the first and the second conductors 20 and 21 to turn on electrically (as shown in FIG. 3-1); then, the exhausting electric valve 11 will be opened to cause a choke valve 22 to release air, i.e., the electric valve 11 will be able to release air slowly. When the accelerator pedal 25 is pushed heavily, the coupling member 17 will have more pressure applied to the contact switch 16 to cause the second and the third conductors 21 and 23 (as shown in FIG. 3-2) to turn on at the same time; then, the exhausting electric valve 12 will be opened to release air; in other words, the electric valve 12 is used for starting the engine quickly. According to the present invention, the electric valves 11 and 12 will be opened upon the accelerator pedal 25 being pushed to cause the compressed air to exhaust out of the power cylinder 8, i.e., to have the power cylinder 8 restored to its ordinary condition, and then the clutch pump 9 will be returned to have the engine engaged with the power transmission assembly. Moreover, the present invention is provided with a shift-removing key 24 mounted at one side of the shift rod 13. The shift-removing key 24 is substantially a switch connected with the quickly exhausting electric valve 12 via a circuit. After a shift key 14 is turned on by closing the switch, the shift may be canceled by turning on (closing the switch) the shift-removing key 24, thus opening the exhausting electric valve 12 to release the compressed air in the power cylinder 8.

According to the present invention, the shift key 14, the shift-removing key 24 and the contact switch 16 are used for replacing the clutch pedal of a car, i.e., to omit the clutch pedal and the operation of stepping down on the clutch pedal; according to the present invention, a driver can avoid the tiredness of changing shift repeatedly; according to the present invention, the clutch is to be operated with the power cylinder so as to prevent the clutch from the wear and tear as a result of pushing the clutch pedal incorrectly; therefore, the clutch can have a longer serviceable life to save the cost of replacing the clutch. Furthermore, the present invention would not affect or curtail the horse power and the torsional force of a car, and would not have the drawback of having insufficient power.

I claim:

1. An automation device for use with a manual shift system of an automobile, said automobile having an engine, a clutch and a power transmission assembly, said automation device comprising:

an air compressor coupled with an engine of an automobile; said air compressor is driven by the engine to produce a high pressure air;

a clutch pump connected to a clutch to disengage and engage the engine from a transmission assembly;

an air tank connected with a power cylinder via a compressed-air pipe; wherein said power cylinder is connected to said clutch pump for driving said clutch pump; an intake electric valve connected to said air tank and said power cylinder therebetween;

two exhausting electric valves connected with said power cylinder; said intake electric valve is connected with a shift key through a circuit; wherein when said shift key is turned on, said intake electric valve opens to let a compressed air enter said power cylinder so as to actuate said clutch pump to disengage the clutch;

one of said two exhausting electric valves connected with a choke valve; said two exhausting electric valves are connected with a contact switch which is connected with a coupling member attached to an accelerator cable;

said coupling member touches said contact switch when an accelerator pedal is pushed so as to open one of said two exhausting electric valves;

wherein when said accelerator pedal is pushed to a first level, said exhausting electric valve with said choke valve is opened for exhausting said compressed air at a slow rate; and when said accelerator pedal is pushed to a second level beyond said first level, said exhausting electric valve without said choke valve is opened so as to have said compressed air exhausted from said power cylinder at a quicker rate to deactuate said clutch pump; and a shift-removing key is mounted on a shift rod, and connected with said exhausting electric valve without said choke valve via a circuit; wherein when said shift-key and said shift-removing key are turned on; said exhausting electric valve is opened so as to exhaust the compressed air in said power cylinder so as to deactuate said clutch pump to engage said clutch.

* * * * *